United States Patent Office 3,349,026
Patented Oct. 24, 1967

3,349,026
REFORMING PROCESS EMPLOYING A DEACTIVATED ISOMERIZATION CATALYST
Burwell Spurlock, Lafayette, and Emanuel M. Blue, Piedmont, Calif., assignors to Chevron Research Company, a corporation of Delaware
No Drawing. Filed Dec. 11, 1964, Ser. No. 417,824
1 Claim. (Cl. 208—140)

This invention relates to a method for realizing incremental value from a particular isomerization catalyst that has been at least partially deactivted.

A recent commercial development has been the use of a platinum-alumina-aluminum chloride catalyst in the low temperature isomerization of organic compounds as, for example, straight and mildly branched-chain paraffins containing 4 or more carbon atoms per molecule. This catalyst, and the isomerization conditions for its use, have been fully described in U.S. Patent No. 2,900,425 (Bloch et al.). As described in this patent, a particularly effective catalyst is one which comprises a composite of from about 0.01 to 2% by weight of platinum disposed on, or otherwise associated with, alumina, and this composite is then in turn impregnated, for example by sublimation, with a chlorine-containing compound such as aluminum chloride. The amount of chlorine-containing compound utilized in preparing the catalyst ranges, according to the patentees, from about 2.0 to about 25% by weight based upon the weight of the alumina-platinum composite prior to impregnation with the chlorine compound. The patentees further state that hydrogen chloride evolves upon impregnation of the composite with the chloride. They attribute this evolution to be due to the reaction of, for example, aluminum chloride with residual hydroxyl groups on the alumina surface. They postulate that the first portion of the aluminum chloride impregnated upon the support may actually be in the chemical form of oxy-aluminum dichloride. They then emphasize that, whether this point is true or not, their catalyst comprises aluminum chloride absorbed on the surface of the platinum alumina composite and it is the particular association of the components which results in the catalytic properties of their catalyst. The patentees disclose that their process is preferably conducted in a hydrogen atmosphere such that the hydrogen to hydrocarbon ratio of the reaction zone feed will lie in the molar range of from about 0.25 to about 10.0. They teach that the operating conditions within the isomerization zone will depend upon the particular feed being isomerized and should generally be conducted at temperatures in the range of from about 100° C. to about 300° C. and, normally, within the limited range of from about 150° C. to about 275° C. The reaction is conducted at superatmospheric pressure in the range of from about 50 p.s.i.g. to about 1500 p.s.i.g. The liquid hourly space velocities (LHSV) are maintained within the range of from about 0.25 to about 10.

In addition to such chlorine-containing compounds as aluminum chloride, recent publications have shown that such compounds as gaseous carbon tetrachloride can also impart the chloride levels and isomerization activity to platinum-alumina composites for use under the isomerization reaction conditions described in the Bloch et al. patent. The present invention is applicable to the treatment and use of catalysts prepared in any of these manners.

The above described isomerization catalysts can be deactivated by contact with a number of deactivating agents. Apparently the most common cause of deactivation is due to the effect of oxygen-containing compounds (normally entering with the feed and/or hydrogen into the isomerization reaction zone) upon the catalyst. It is believed that such oxygen-containing compounds effect a deleterious change in the chemical structure of the chloride-containing compound imparting catalytic isomerization activity to this catalyst. This belief is strengthened by the finding that a completely deactivated isomerization catalyst of this type will still possess a large amount of chloride, an amount that would be more than adequate to promote isomerization if it were present in the same form as when first impregnated upon the alumina-platinum composite.

Other forms of isomerization catalyst deactivation can be attributed to coking of the catalyst, thereby masking the active sites of the catalyst, due to excessive feed cracking (a relatively rare occurrence since the isomerization process employing the described catalyst is usually conducted at such low temperatures that cracking is minimized), and deactivation by poisoning by sulfur and fluoride-containing compounds that can occur in the isomerization zone feedstocks. Catalysts deactivated by these agents will likewise still possess large chloride levels. Insofar as the particular form or combination of deactivation forms is concerned, it is immaterial since the present invention is applicable to the utilization of the particular spent isomerization catalyst despite the manner by which it was deactivated.

After the catalyst has been deactivated to a point where it is no longer economic to continue the isomerization operation, replacement is required.

We have now found a method for realizing incremental value from this at least partially spent isomerization catalyst, i.e., this at least partially deactivated isomerization catalyst which had been prepared by reacting a chlorine-containing compound with a composite of platinum and alumina such that the catalyst contains well over 1 weight percent (of the total catalyst) chloride, and wherein the catalyst has become at least partially deactivated due to contact with deactivating agents which have adversely affected the isomerization activity of the catalyst. The method comprises reducing the chloride level of this catalyst to below 1 weight percent and contacting the resulting chloride-reduced catalyst in a reforming zone with hydrogen and a petroleum fraction under catalytic reforming conditions.

As is well known in the petroleum refining art, catalytic reforming refers to the treatment of petroleum fractions, generally boiling within the range of about 100° to about 450° F. to improve the anti-knock characteristics of the fractions for use in gasolines. Since aromatic hydrocarbons generally have high octane numbers, the normal objective of a reforming operation is dehydrogenation of naphthenic hydrocarbons and dehydrocyclization of paraffins, both reactions producing aromatics. The reforming process involves a net production of hydrogen and is conducted in the presence of a reforming catalyst under an elevated pressure and at a temperature well above 750° F. Operating conditions for reforming are well known and will generally fall within the temperature range of about 800° to 1050° F., and a pressure range of about 100 to 1000 p.s.i.g. Hydrogen to feed ratios (mol) of at least 3 are generally employed. Contact of the feed with reforming catalysts is generally at an LHSV of from about 0.2 to 5.0. When employing the treated isomerization catalyst of this invention, the reforming conditions described above are entirely suitable and preferred.

As previously noted, the chloride level of the spent isomerization catalyst described here is high, virtually always above 1 weight percent of the total weight of the catalyst, although the chloride is in a form that no longer promotes efficient isomerization under the Bloch et al. operating conditions employed and set forth above. However, the chloride form of the deactivated catalyst will promote hydrocracking at reforming temperatures or lower. Although some hydrocracking is desirable in a commercial reforming process, it has been found that chloride levels above about 1 weight percent are undesirable inasmuch as they lead to excessive hydrocracking. We have found that by reducing the chloride level of the deactivated isomerization catalyst to below about 1 weight percent, the resulting catalyst is an extremely active reforming catalyst that is excellent for maintaining the delicate balance between hydrocracking, dehydrogenation and dehydrocyclization.

The reduction in chloride level of the deactivated isomerization catalyst can be accomplished in a number of ways, dependent to a certain extent upon the manner in which the catalyst was deactivated. Thus, isomerization catalysts that have been deactivated by contact with oxygen-, sulfur- or fluoride-containing compounds can be reduced in chloride level in the same manner. Coke deactivated catalysts generally are stripped of chloride in a more limited procedure which is discussed below.

The catalysts deactivated by operations other than by coke laydown can be treated either prior to, or after, insertion in the reforming zone, i.e., ex situ or in situ. Ex situ chloride stripping can be done by contacting the defined spent isomerization catalyst with an oxygen-containing compound such as air, hydrogen, an inert gas such as nitrogen or flue gas, or with such gases containing some water vapor, at elevated temperatures. It is preferred that this stripping step be done with at least one of the noted gasses such that contact with the catalyst is done in the presence of from about 100 to 1000 molal parts per million water vapor. It is advisable to maintain the water vapor level of the stripping gas below saturation, particularly in situ stripping, so as to prevent the separation of a water phase.

The temperature employed in the stripping step will, of course, be a function of the gas rate, with a lower temperature suitable if large gas rates are employed. Simple experimentation will allow one skilled in the catalyst art to arrive at the optimum correlation of gas rate, water vapor content of the gas (if any), and the temperature so as to effect the desired chloride reduction. In general, contact temperatures of from about 400° up to about 1100° F. will be quite suitable. Temperatures above about 1100° F. should normally be avoided since some sintering of the alumina-platinum composite could result in lower catalyst surface areas. In situ chloride stripping (which includes stripping in the isomerization reactor) can be similarly accomplished with the same gasses and, additionally, with the recycled gas (dry or containing water vapor) produced in starting up the catalytic reforming zone, or by injecting water into the reforming zone vaporized feed during, or after, startup.

It is also feasible to reduce the chloride level of the spent isomerization catalyst by washing with an aqueous solution. The chloride is thereby removed by a simple leaching step.

The chloride removal operation from an isomerization catalyst deactivated by coke formation can be accomplished, either in situ or ex situ, by contacting the catalyst with an oxygen-containing gas at a temperature of from about 750° to 1100° F. so as to oxidize the coke from the catalyst. This operation will both remove the coke and effect the desired chloride removal.

The following examples show several methods of effecting the chloride-reduction step.

*Example 1*

A sample of spent isomerization catalyst initially prepared as described by Block et al., deactivated in isomerization operation service, apparently by contact with water entering the reaction zone with the feed and/or recycle hydrogen, was analyzed and found to contain (in weight percent of the total catalyst), 0.37% platinum (as the metal), 2.59% chloride and the remainder alumina. The catalyst had a platinum surface area, measured in micromoles of CO adsorbed per gram of catalyst, of 9.8. Despite its previous service in the isomerization process, the catalyst had no detachable coke level, this apparently due to the low reaction temperature (about 350° F.) employed.

A sample of this deactivated catalyst was placed in a muffle furnace at 900° F. for two hours. During this period, the furnace was purged with a stream of fresh plant air. Analysis of the catalyst after this treatment revealed that the chloride had been reduced to 0.6% per weight. Thus, a simple heat treatment in air accomplished the desired chloride reduction. This type of ex situ treatment could, of course, be applied to an in situ method.

*Example 2*

This example shows that chloride stripping of the isomerization catalyst can be done in situ within the reforming reaction zone utilizing the reforming process streams. In the example, a test reforming zone feed is employed. This test feed was composed of a hydrofined mixture of straight-run, thermally and catalytically cracked naphthas having an ASTM D86 initial boiling point of 168° F., a 5% point of 220° F., a 50% point of 284° F., a 95% point of 368° F., an end point of 424° F., and contained, in volume percent, 50.4% paraffins, 43.4% naphthenes, and 16.2% aromatic hydrocarbons. During the course of the test feed contacting step described below, the reforming reaction total pressure was kept at 500 p.s.i.g., the feed entered the reactor at an LHSV of two, and the mol ratio of hydrogen (recycled) to feed at the reactor inlet was maintained at eight. During the feed contacting portion of the run, only the reaction temperature and the water content of the hydrogen recycle gas were allowed to vary. The reaction temperatures referred to in this example are average catalyst temperatures within the reactor.

A sample of the same deactivated isomerization catalyst described in Example 1 was placed in a reforming reactor and the catalyst at least partially dehydrated by heating up to 900° F. with a once-through stream of hot, dry nitrogen flowing over the catalyst. This temperature was held for two hours. A small, unmeasured amount of chloride was removed from the catalyst by this preheating step. The reactor was allowed to cool to 700° F. and the nitrogen was then purged from the system by a hydrogen stream. After purging, hydrogen and the test feed were passed into the reforming zone (initially at 700° F.) and after about two hours, the reaction temperature was increased to 889° F. and was kept there for an on-stream period of 125 hours. Sampling was undertaken at the 84th hour of this period. The recycle gas contained 34 parts per million (p.p.m.) of water. A $C_5^+$ liquid product recovery of 78.5 volume percent having an F-1 clear octane number of about 96 was recovered. This $C_5^+$ yield is about 6% lower than is obtained with conventional reforming catalysts under these conditions. The $C_4^-$ gas make was correspondingly high. These data show that the catalyst containing the relatively high chloride concentration has excessive hydrocracking activity and, hence, is unsuitable for direct use in the catalytic reforming process.

After 125 hours of total on-stream period, the temperatur was reduced and maintained at about 865° F. for about 135 hours until a total on-stream period of about 260 hours had elapsed. During this 135-hour period, three samplings were performed at total on-stream periods of 170, 199, and 260 hours. The results of these samplings can be summarized as follows:

| On-Stream Periods (hrs.) | 170 | 199 | 260 |
|---|---|---|---|
| Recycle gas $H_2O$ content, p.p.m. | 53 | 48 | 39 |
| Average Catalyst Temperature, ° F. | 866 | 865 | 861 |
| Total $C_5^+$ Liquid Product, vol. percent | 86.3 | 86.7 | 88.0 |

From the data on the $C_5^+$ liquid product, it can be seen that, as the on-stream period progressed at a relatively constant temperature, the liquid product production increased, indicating a reduction in hydrocracking caused by some additional chloride removal from the catalyst by contact with the recycle gas and vaporized feeds.

After 260 hours on-stream, water was injected into the hydrogen-recycle gas so that it initially contained over 500 p.p.m. of water. The same reaction temperature (about 865° F.) was maintained for 120 hours (260 hours on-stream to 380 hours on-stream) and three samplings were made, at 316, 340, and 364 total hours on-stream. These results can be summarized as follows:

| On-Stream Periods (hrs.) | 316 | 340 | 364 |
|---|---|---|---|
| Recycle gas H₂O content, p.p.m. | Over 500 | Over 500 | 240 |
| Average Catalyst Temperature, °F. | 861 | 864 | 866 |
| Total C₅⁺ Liquid Product, vol. percent | 89.2 | 89.9 | 91.0 |
| Approx. Octane No., F-1 Clear | 86 | 86 | 85 |

The increase in total $C_5^+$ liquid product as the relatively constant temperature operations proceeded, indicates that additional chloride has been removed from the catalyst and at a faster rate, due largely to the presence of higher water levels in the recycle gas. Thus, it can be seen that the rate of chloride stripping from the catalyst can be increased by contacting the deactivated catalyst with gases containing water levels above about 200 p.p.m.

After a total on-stream period of about 380 hours, the catalyst temperature was raised to 889° F. and maintained in the range 889° to 882° F. for a period of 140 hours, i.e., to a total on-stream period of about 520 hours. Two samplings were performed during the period. At 520 hours, the temperature was again raised to a temperature of 942° F. and kept at this temperature for about 55 hours until the final total on-stream period of 575 hours was reached. These temperature raises were done to produce a $C_5^+$ liquid product having an octane number above 99. One sampling was taken during the latter high temperature period. The last three sampling results are shown below.

| On-Stream Periods (hrs.) | 403 | 507 | 537 |
|---|---|---|---|
| Recycle Gas H₂O content, p.p.m. | 51 | 24 | 49 |
| Average Catalyst Temperature, °F. | 889 | 882 | 942 |
| Total C₅⁺ Liquid Product, vol. percent | 89.1 | 88.5 | 79.4 |
| Approx. Octane No., F-1 Clear | 88.0 | 86.5 | 99.5 |

After completion of the 575 hour on-stream period, the catalyst was analyzed and was found to have a chloride content of 0.30 weight percent, a reduction from an initial 2.59% present on the original deactivated isomerization catalyst.

The effectiveness of this in situ chloride stripping step and the benefits to be gained by its use is emphatically shown by the product amounts and quality when comparing a reforming operation with a catalyst having a high chloride level and one wherein the chloride level has been reduced to the claimed level. After 84 hours of total on-stream time and where the water vapor level of the recycle gas was only 34 p.p.m., the $C_5^+$ reformate yield was 78.5 volume percent and the octane number (F-1 clear) was about 96. This must be contrasted with the sample taken after 537 hours on-stream (and after contact with a recycle gas containing over 500 p.p.m. water vapor) which showed 79.4 vol. percent yield of 99.5 F-1 clear octane number product. Thus, there was an increase of almost 1% in the yield and 4.5 number increase in the F-1 clear octane number of the $C_5^+$ reformate. This improvement can be attributed to reducing the catalyst chloride level to the desired level. Thus, the objective of the present invention was accomplished during the initial stages of the reforming process itself.

The above examples describe several methods of reducing the chloride level of the particular deactivated isomerization catalyst that the present invention is concerned. Utilizing the data of these examples, a preferred method of operating the method of the present invention can be briefly described. In this preferred method, the at least partially deactivated catalyst is removed from isomerization service and inserted into the reaction zone of a reforming process. Hot hydrogen gas is then passed into the reactor and is recirculated through the reforming zone. The hydrogen will pick up water from the catalyst (which has been exposed to air) and will begin to effect chloride removal from the catalyst. Since HCl will be present in the recycle gas, this gas should be passed through a caustic scrubber or otherwise be treated to remove HCl prior to the return of the recycle gas to the reforming reaction zone. After the catalyst reaches a temperature in the range of from about 650° to 750° F., the reformer feed is passed, along with the recycle gas, into contact with the catalyst. The noted temperature range is high enough to allow the reforming reaction to come on stream to a point where hydrogen is produced but is still low enough to prevent appreciable fouling of the catalyst due to excessive hydrocracking in the event the chloride level has not yet been reduced to below about 1 weight percent. The temperature can then be gradually increased to the desired reforming temperature, this temperature being, as indicated above, in the range of from about 800° to 1050° F. If necessary, water injection can be made into the recycle gas to speed chloride removal if sufficient chloride has not been removed at this stage of the reforming operation. Upon attaining the desired chloride level, the reforming operation can be conducted in the conventional manner.

In some situations it may be desirable (for reforming) to add other promoters to the catalyst, e.g., fluorides, and this can be done by adding, for example, hydrogen fluoride into the reforming reaction zone during the start-up procedure or during operation.

Although only specific modes of the method of the present invention have been described, it is apparent that numerous variations in the method can be made without departing from the spirit of the invention, and all such variations that fall within the scope of the appended claim are intended to be embraced thereby.

We claim:

A process for reforming a naphtha feed which comprises (1) converting an isomerization catalyst that has been at least partially deactivated, said isomerization catalyst consisting essentially of platinum disposed on an alumina support and containing over 3 weight percent aluminum chloride chemically combined with said support through the surface hydroxyl groups therein, said isomerization catalyst having been at least partially deactivated by contact with deactivating agents during the isomerization reaction thereby effecting a deleterious change in the chemical structure of the chloride-containing compound imparting catalytic isomerization activity, said method of converting the deactivated isomerization catalyst comprising reducing the chloride level of catalyst to below 1 weight percent by contacting said catalyst with a gas having a water vapor content of from about 100 to about 1000 molal p.p.m., at a temperature of from about 400° to about 1100° F. and (2) contacting said naphtha feed with the resulting chloride reduced catalyst in a reforming zone at a temperature in the range of from about 800 to about 1050° F. and a pressure in the range of from about 100 to about 100° p.s.i.g. in the presence of hydrogen to produce a reformed naphtha with a substantially increased aromatic content and a substantial amount, on a net basis, of hydrogen.

(References on following page)

References Cited

UNITED STATES PATENTS

| | | | |
|---|---|---|---|
| 2,900,425 | 8/1959 | Bloch et al. | 260—683.75 |
| 2,999,805 | 9/1961 | Myers | 208—140 |
| 3,011,968 | 12/1961 | Webb | 208—140 |
| 3,020,240 | 2/1962 | Lockett | 208—140 |
| 3,140,263 | 7/1964 | Payne | 208—140 |
| 3,140,264 | 7/1964 | Oleck et al. | 208—140 |
| 3,173,857 | 3/1965 | Haensel | 208—139 |

DELBERT E. GANTZ, *Primary Examiner.*

H. LEVINE, *Assistant Examiner.*

UNITED STATES PATENT OFFICE
CERTIFICATE OF CORRECTION

Patent No. 3,349,026                                October 24, 1967

Burwell Spurlock et al.

It is hereby certified that error appears in the above numbered patent requiring correction and that the said Letters Patent should read as corrected below.

Column 1, line 12, for "deactivted" read -- deactivated --; line 40, for "absorbed" read -- adsorbed --; column 4, line 3, for "detachable" read -- detectable --; line 24, for "50.4%" read -- 40.4% --; lines 58 and 59, for "temperatur" read -- temperature --; column 6, line 70, for "100 to about 100°" read -- 100 to about 1000 --.

Signed and sealed this 19th day of November 1968.

(SEAL)

Attest:

Edward M. Fletcher, Jr.                              EDWARD J. BRENNER

Attesting Officer                                        Commissioner of Patents